(Model.)
H. C. ROOT.
DRAFTING INSTRUMENT.
No. 269,719. Patented Dec. 26, 1882.
4 Sheets—Sheet 1.
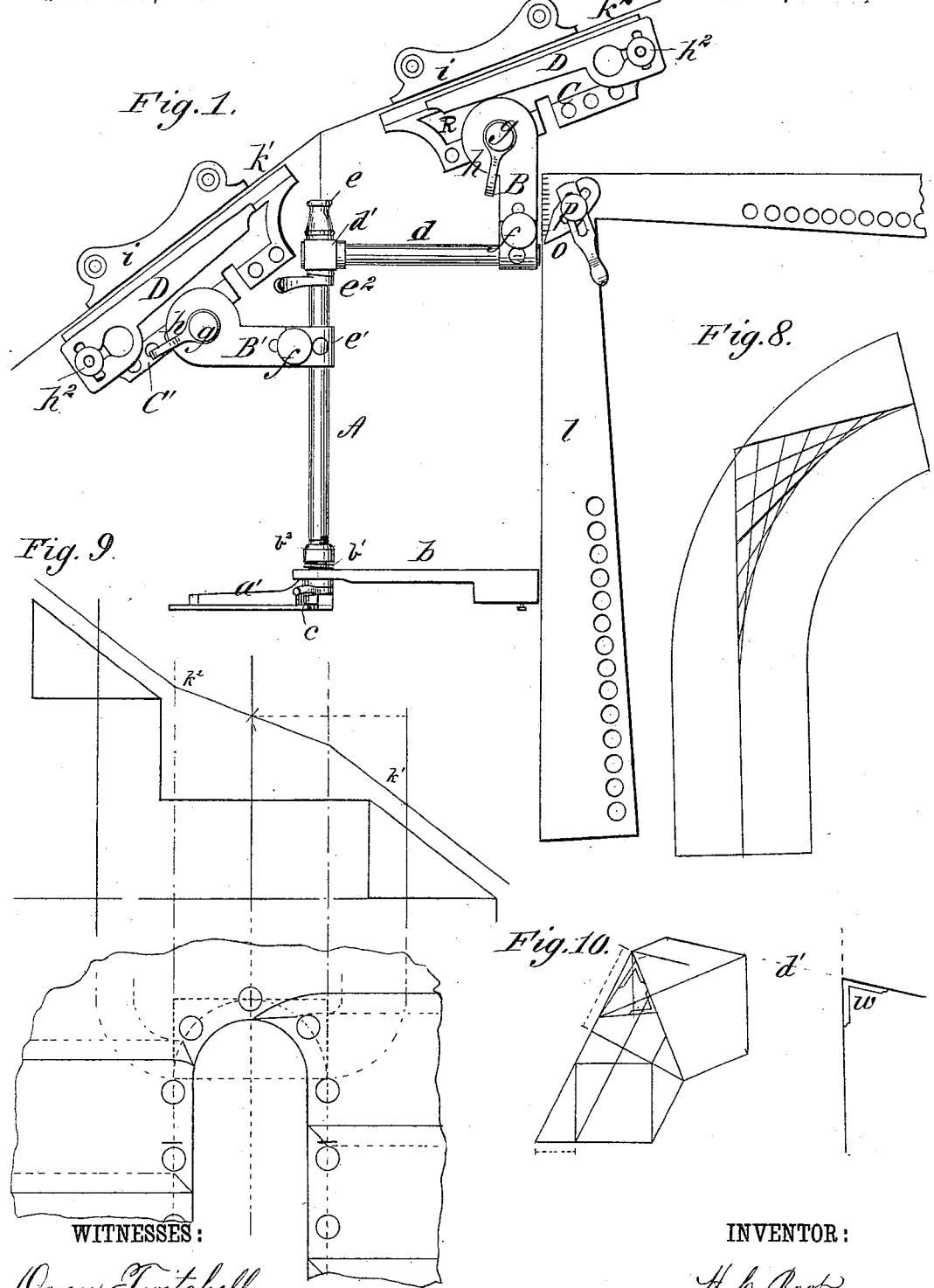
WITNESSES:
Donn Twitchell
C. Sedgwick
INVENTOR:
H. C. Root
BY
Munn &Co
ATTORNEYS.

(Model.)
4 Sheets—Sheet 2.
H. C. ROOT.
DRAFTING INSTRUMENT.
No. 269,719. Patented Dec. 26, 1882.
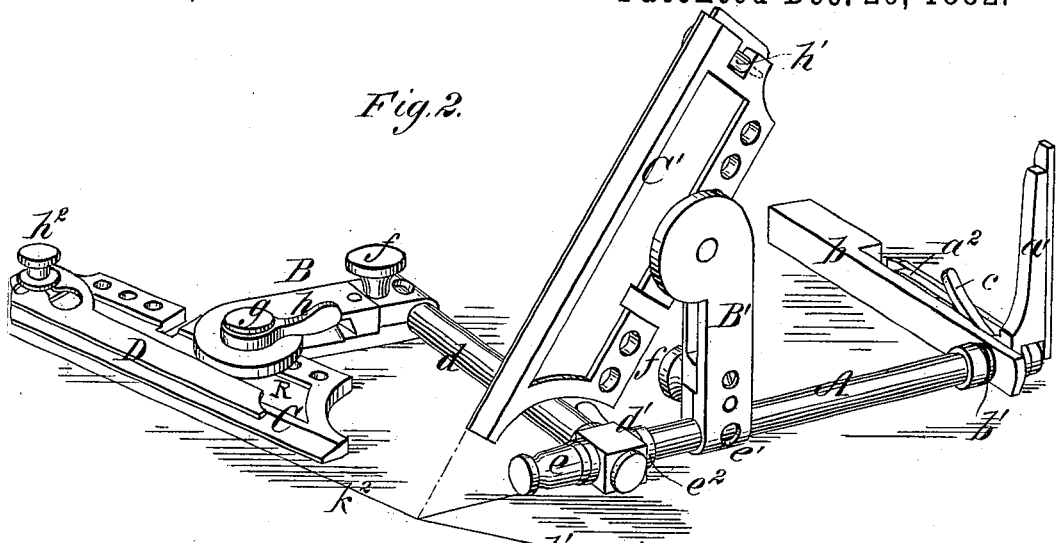
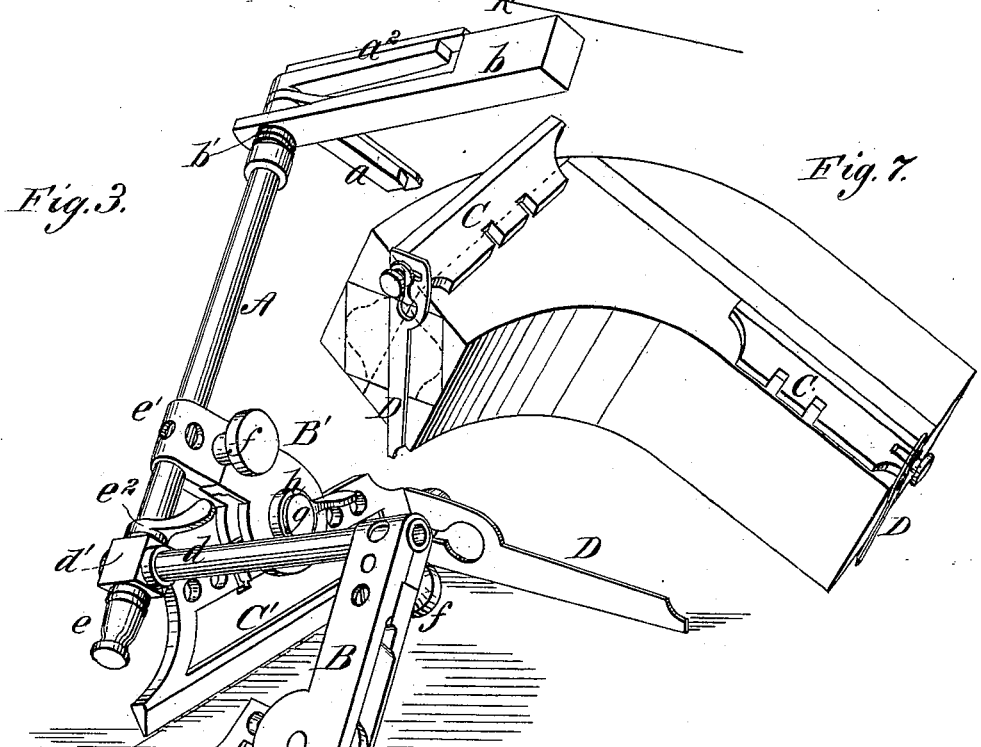
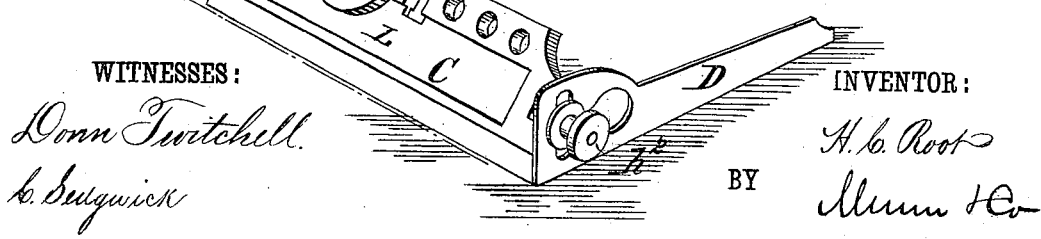
WITNESSES: Donn Twitchell, C. Sedgwick
INVENTOR: H. C. Root
BY Munn & Co.
ATTORNEYS.

(Model.)
H. C. ROOT.
DRAFTING INSTRUMENT.
No. 269,719.
4 Sheets—Sheet 3.
Patented Dec. 26, 1882.
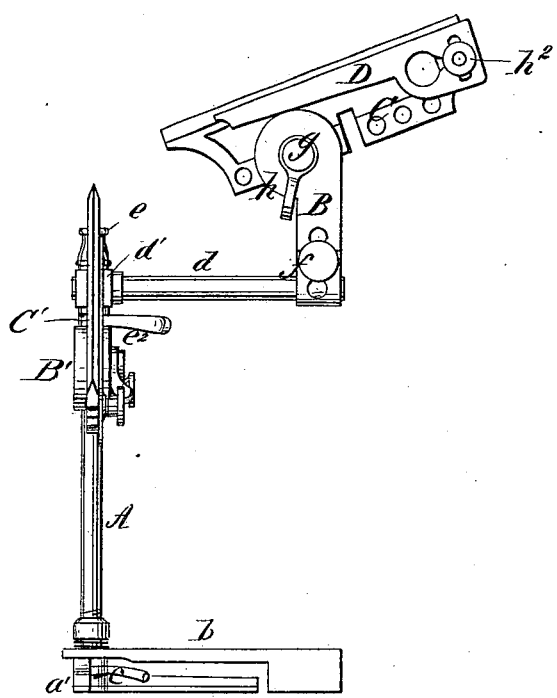
Fig. 2.ª
WITNESSES:
Dorin Twitchell.
C. Sedgwick
INVENTOR:
H. C. Root
BY Munn & Co
ATTORNEYS.

(Model.)
H. C. ROOT.
DRAFTING INSTRUMENT.
No. 269,719. Patented Dec. 26, 1882.
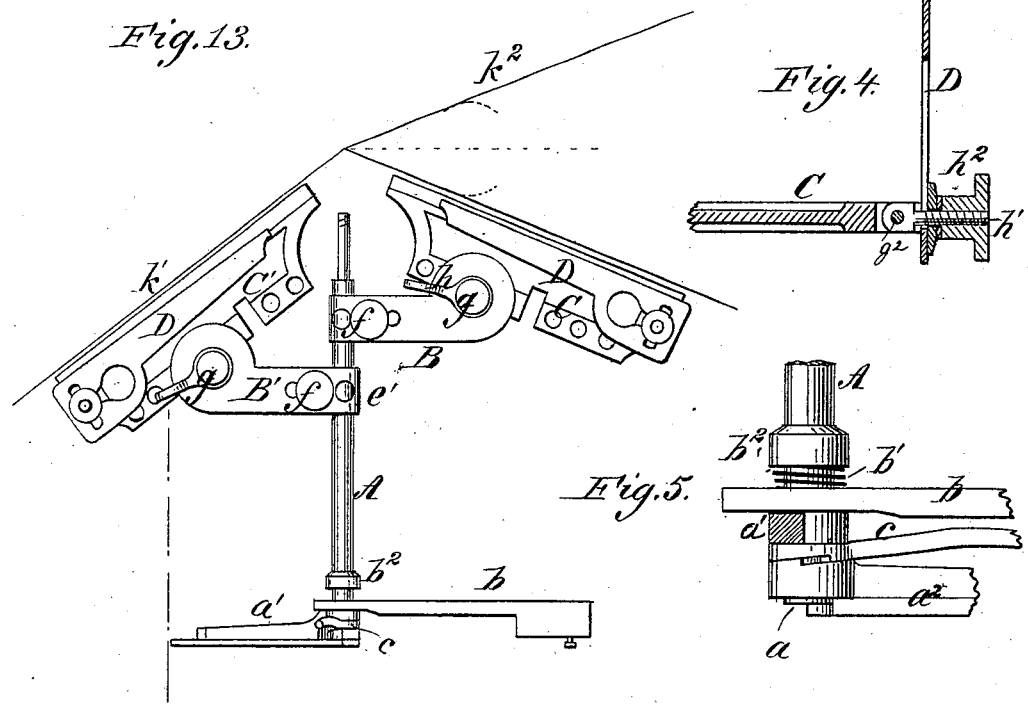
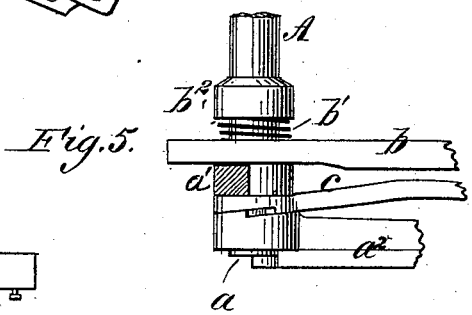
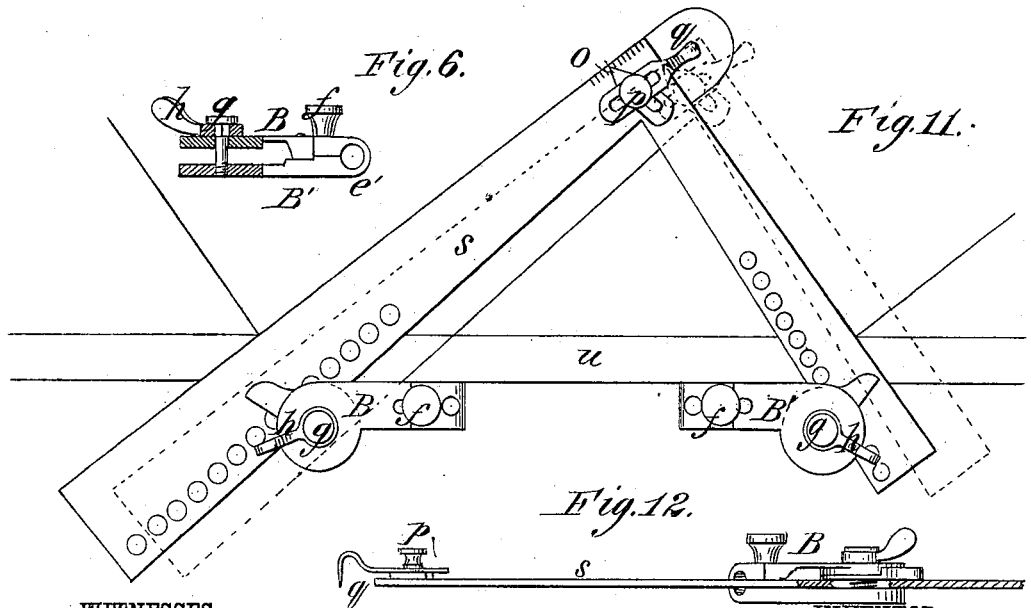
WITNESSES:
INVENTOR:
H. C. Root
BY
ATTORNEYS.

UNITED STATES PATENT OFFICE.

HENRY C. ROOT, OF SAN FRANCISCO, CALIFORNIA.

DRAFTING-INSTRUMENT.

SPECIFICATION forming part of Letters Patent No. 269,719, dated December 26, 1882.

Application filed January 23, 1882. (Model.)

To all whom it may concern:

Be it known that I, HENRY C. ROOT, of San Francisco, in the county of San Francisco and State of California, have invented a certain new and useful Tangentograph, of which the following is a full, clear, and exact description.

My invention consists in an instrument for determining the lines and bevels of circular stair-rails, for determining the lines and bevels for jack-rafters in hipped roofs, and other purposes of a similar nature, the object in all cases being to determine the angle subtended by the tangents and the pitches or bevels which are in the same plane, as more particularly hereinafter explained and claimed.

Reference is to be had to the accompanying drawings, forming part of this specification, in which similar letters of reference indicate corresponding parts in all the figures.

Figure 1 is a view of the instrument showing it in its first position on the plan-board. Fig. 2 is a perspective view of the instrument in the second position. Fig. 2$^a$ shows the second position in plan view. Fig. 3 shows the third position of the instrument, by which the verticals are obtained. Figs. 4, 5, and 6 show details of construction in the instrument. Figs. 7, 8, 9, and 10 are illustrative views of the work done by the instrument. Fig. 11 is a plan view, and Fig. 12 a cross-section showing the application of certain parts of the instrument in the work of determining the previous angle for applying the tangentograph. Fig. 13 is a view of the instrument showing it in its first position, but with certain parts removed.

I will first describe the construction of the instrument.

A is the supporting part of the instrument, supported by a base that consists of two legs or pieces, $a'$ $a^2$, and an auxiliary piece, $b$. The pieces $a'$ $a^2$ are apertured to receive the end of the post, and the post is shouldered to form a journal for the upper piece, and a screw, $a$, is formed on the end of the post to receive the lower piece, $a^2$, that is screw-threaded. The piece $b$ is on the post above the legs $a$, and beneath a spiral spring, $b'$, (see Fig. 5,) fitted between piece $b$ and a shoulder, $b^2$, of the post. The spring serves to give the friction required for the auxiliary piece $b$, and is regulated by turning the piece $b^2$ on its screw. A cam-lever, $c$, on the post between the pieces $a'$ $a^2$, serves for clamping the base-pieces, so as to retain them at any desired angle. On the upper end of the post is journaled a horizontal arm, $d$. This is formed with an eye-piece, $d'$, that sets over the post above a shoulder or flange and beneath a nut, $e$, secured on the journal. On the post, beneath the eye-piece $d'$, is a cam-lever, $e^2$, by which the arm can be clamped in position against the lower side of nut $e$.

On the arm $d$ is fitted a clamping-slide, B, carrying the tangent-blade C, and on the post A is a similar clamping-slide, B', carrying a tangent-blade, C'. These two blades C C' represent the two tangents to the curve of the stairs, which tangents subtend the angle sought, and are fitted each to their slide as follows: The slide B' is apertured at one end to set over the supporting-rod, and the apertured portion $e'$ is cut out or disconnected at one end. A screw, $f$, tapped through the portion $e'$ into the slide, serves to clamp the slide B' to the rod A. The outer end of the slide B' is slotted or forked, and apertured through the sides of the fork to receive a screw-pin, $g$. (See Fig. 6.) On the end of pin $g$, outside the fork, is a wrench, $h$, by which the screw is turned to press the forked ends of the slide together to clamp the tangent-blade C'.

D D are the twist-bevels, swiveled on one end of the blades C C'. These bevels D consist each of a thin strip of metal having a straight edge, and are attached, as shown in Fig. 4, by a screw, $h'$, that extends through the end of the strip into a slot formed in the blade C or C', the end of the screw being formed as an eye, through which a hinge-pin, $g^2$, passes. A nut, $h^2$, on the outer end of the screw serves to clamp the bevels. The bevels may thus be turned for use at right angles to the blades; or they can be turned down upon the blades, as shown in Fig. 1.

In connection with the instrument I use the straight-edge pieces $i$, (shown in Fig. 1,) which are to be fixed on the tangent-lines to serve as stops for the blades C C'.

In Fig. 1 the instrument is shown as placed upon a plan view of a stair-rail to illustrate its manner of use. The full plan is more clearly shown in Fig. 9, which illustrates the manner of carrying out the tangent-lines $k'$ $k^2$, inclosing the center line of the rail, to find the lines $k' k^2$ in elevation and their angle. This is the usual method, and the further operation as usually practiced is illustrated in Fig. 10, but need not be described. I remark simply that it is at this point that my instrument comes into use to save the complicated work and prevent the liability of mistakes. The instrument is first placed upright on the plan-board and the base-pieces $a'$ $a^2$ adjusted to the tangent-lines and fixed. The base-pieces as thus placed represent the tangent-lines on the plan, the base $a'$ corresponding to tangent $k'$ and base $a^2$ to tangent $k^2$, and when the instrument is laid upon the plan the base-piece $a'$ will lie flat to correspond with the slide B', carrying blade C'. The vertical post A is placed on the line of intersection of the tangent-lines $k'$ $k^2$. A straight-edge, as shown at $l$, is placed parallel with the center line at a distance equal to the length of the horizontal arm $d$ from the center of rod A. The base-piece $b$ projects to the same length as arm $d$, which will be vertically adjusted and then clamped, and the blades C C' moved up to the stops $i$, which are upon the pitch or tangent lines $k'$ $k^2$, and the blades C C' and slides B B' are then to be clamped.

The position of the tangent-blades C C' and their bevels D govern the direction of the twist, either to the right or left hand. The blade C on the horizontal arm $d$ is lettered R on one side and L on the other, with the design to indicate right and left hand twists. Thus if the stairs turn to the right the letter R must be in sight when the instrument is lying flat on the plan-board, as in Fig. 1, and the bevels D in that case will be at the inner end of the angles, or nearest the post or line of intersection; but if the stairs are to turn to the left then the initial blade must be reversed on the arm $d$, which will exhibit the letter L, and the bevels D will then be on the outer end of the blades C C', as shown. This arrangement of parts is to secure the necessary effects in the application of the bevels D to the wreath-piece from which the rail is to be made. After the blades C C' have been moved to the pitch-lines $k$ $k'$ and clamped, the horizontal arm $d$ is to be released by turning the lever $e^2$, and the instrument then revolved to the right until the base-piece $b'$ comes in contact with the plan-board, as shown in Figs. 2 and 2ª, and the arm $d$ then clamped. By this position the angle shown in Fig. 2 is developed—viz., the angle of tangents $k'$ $k^2$ after revolution. The bevels for the joints are then taken by turning bevels D down upon the board, as in Fig. 3, the instrument being first inverted on the plan-board, as shown in Fig. 3. The angle of the tangents is at the same time indicated by the tangent-blades C C'. The proper angle having been thus obtained and marked on the board, the wreath-piece (shown in Fig. 7) can be readily got out. The blades C C' and the bevels D are now used to mark the ends of the wreath-piece, in order that it may be worked out. The ends of the piece are shown square. The bevel, when applied to the end or joint of the piece, as in Fig. 7, represents a vertical plane through the joint, when the piece is raised to the angle of the elevation shown in Fig. 3, with the blades on the tangent lines; or, in other words, the center line for the wreath or molding is properly indicated.

The plan of rail shown in Fig. 9 is to the left, and requires the initial L to be shown on the blade C. When placed in the clamp so as to expose letter R and the other blade similarly arranged the application of the bevels would have produced a right-hand rail. The same problem can be worked out with the instrument without using the horizontal arm $d$. Fig. 13 illustrates the arrangement of the parts. The horizontal arm $d$ is left out and both slides B B' attached to post A. Blade C is placed to descend from the point of intersection at the same angle with a horizontal line as it rose from the horizontal line in the other arrangement. The ends of arms $a'$ $a^2$ at the base of post A are now used for adjusting the center over the line of intersection. The arm C should remain fixed at the upper end of the shaft while the vertical adjustment is made of the arm C'. After the adjustment is made arm C is loosened and the instrument is to be revolved to the right and then clamped. The angle now marked by the blades is shown at $w$, Fig. 10, and all that is necessary is to produce one of its sides, $d'$, and the angle, as in Figs. 3, 7, and 8, is produced. The instrument is to be inverted, as shown in Fig. 3, and bevels taken the same way as at first and produce the same results.

It will be observed that I require no lines except the plan and elevation of tangents, and thus avoid the errors that arise from the slightest discrepency of the lines.

Fig. 11 illustrates a combination of the clamping-jaws B B' with a tapered blade-square, $s$, and other devices to produce a combination pitch-board for laying off the strings of a staircase in one operation without using templets, and without restriction by thickness of step. The string-board $u$ is the one which is fastened to the wall, and is called the "wall-string." One end of steps and risers is fastened in the string by a wedge. To adjust the square a line is gaged on the base of board, one inch or more from the edge, to mark the interior intersections of the step-lines. The taper blades of the square correspond to steps and risers of a certain thickness. The square is laid on the string-board with its outer edges on the step-lines, and the slides B B' clamped on the blades and taking against the string-board to guide the movement of the square in marking out the thickness of the steps and risers. Supposing the increase required in thickness to be one-quarter inch, that distance is measured down on the riser-line and the square then moved the distance marked, which is the distance shown by dotted lines. The thickness of the steps is now indicated by the inner edge of the blade. This position is now marked by adjusting the pointer o and clamping by the binding-screw p, so that in marking out the other steps the pointer will serve as a guide for placing the square without the necessity of measuring at each step. The set-screw p also carries an adjustable centering-point, q, which is used for obtaining the center of the circle that forms the outer edge of the step. This pointer being adjusted to place, its end is to be pressed down to mark the edge of the board, the mark indicating the center of the circle, and the operation of marking out the risers and steps by means of the square, as before described, may then be proceeded with. If thicker steps are wanted, the marker o is to be moved to indicate on the riser-line the increase of thickness required.

Other combinations for various kinds of work can be made with the parts of the instrument.

I do not limit myself to the details of construction exactly as set forth. For instance, a thumb-screw may be used in place of the lever-wrench h. The object obtained by the lever is, when the instrument is applied, for the purpose of taking the angle for the mold and getting the bevels. The blades are sometimes greatly inclined to the draft-board, and if the thumb-screw projected toward the board it might interfere so as to keep the blades from contact with the board. The use of the lever prevents this and allows the instrument to be placed on the board properly.

Having thus fully described my invention, I claim as new and desire to secure by Letters Patent—

1. The twist-bevels D, attached by pivoted screws to the tangent-blades C C', substantially in the manner shown and described, whereby the bevels can be turned parallel to the blades, as set forth.

2. The tangent-blades C C', provided with twist-bevels D and sustained by slides B B' on the standard, substantially in the manner shown and described.

3. The combination, with the blades C C', of the twist-bevels D, pivoted screws h', and nut h², substantially as described, for operation as described.

4. The forked clamping-slide B, provided with clamping-screw f for securing the slide to either arm d or the standard, and also provided with screw g and lever-wrench h for compressing the forks of the slide, substantially as described.

5. The combination of center post, A, swinging arm d, and tangent blades C C', and clamping-slides B B', substantially as shown and described, for operation as set forth.

6. The base-pieces a' a², screw a, and cam-lever c, combined with the shouldered post A, substantially as shown and described.

7. The auxiliary base-piece b, spring b', and screw-piece b², combined on the center post, A, substantially as shown and described.

8. The combination, with center post, A, of one or more clamping-slides, B B', carrying tangent-blades, substantially as shown and described.

9. The stop-pieces i i, in combination with the instrument provided with tangent-blades C C', substantially as described.

10. A tangentograph made substantially as herein shown and described, and consisting of a center post with base-pieces and auxiliary base and adjustable arm working at one end on the center post and carrying at the other end an adjustable clamping-slide with tangent blade and bevel, and an adjustable clamping-slide working on the center post and carrying a tangent blade and bevel, all operated as described, whereby the proper lines and bevels for the mold and wreath-pieces of helices, twisting-rails, and other analogous forms may be quickly and practically determined, as set forth.

H. C. ROOT.

Witnesses:
N. P. LANGLAND,
H. VANDENBERGH.